Patented July 30, 1935

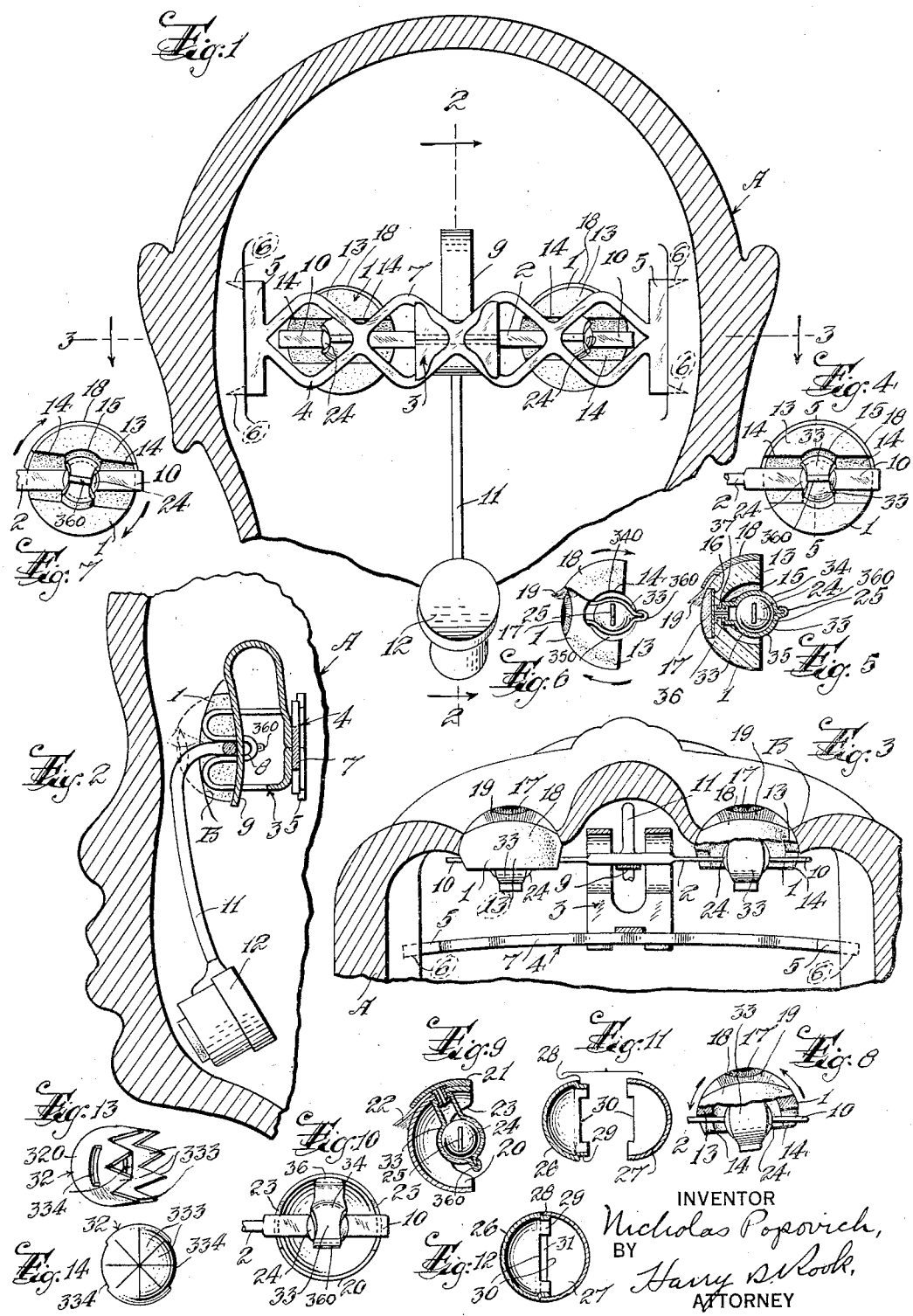

2,009,517

UNITED STATES PATENT OFFICE 2,009,517

ADJUSTABLE EYE MEMBER FOR DOLLS

Nicholas Popovich, Teaneck, N. J., assignor of one-third to Joseph A. Taferner and one-third to Leo J. Schlitzer, both of New York, N. Y.

Application November 10, 1933, Serial No. 697,370

7 Claims. (Cl. 46—40)

This invention relates in general to eye sets for dolls and artificial figures, which sets include eye members rotatably mounted with the head of a doll or the like so as to cooperate with eye openings or sockets in said head and simulate natural movement of the eyes as in the opening and closing thereof. Eye sets of this general character usually include eye members and a supporting means secured in the doll head upon which the eye members are mounted in proper relation to the eye openings in the head.

Those skilled in the art have found that the eye openings or sockets in different doll heads generally bear different relations to one another. These sockets or openings are sometimes out of horizontal alinement with one another, or are spaced apart different distances. When these conditions exist, the placing of the eye mountings in the head results in the initial location of the representation of the iris and pupil in the eye member in such a position that it does not register properly with the eye socket or opening in the doll head. Also, the eye members are frequently arranged on the supporting means so that the eye members have a "cross-eye" or "wall-eye" relation to the eye openings, or produce the appearance of diverging or converging sight lines.

Under such circumstances, great difficulty has been experienced in properly adjusting the eye members relative to the supporting means and to the sockets or eye openings in the doll head. This operation, in addition to being difficult, requires considerable time and expense.

One object of my invention is to provide novel and improved means whereby the eye members may be easily, quickly and accurately adjusted in relation to the supporting means or mounting mechanism and the eye sockets or openings in the doll head, by manually rotating the eye members in a plurality of angularly disposed directions simultaneously and without danger of injury to the eye members, mounting, or doll head.

Another object is to provide a novel and improved means for connecting the eye members to the mounting mechanism, which shall comprise a clamp fastened to each eye member and rotatably embracing a sphere slidably mounted on the yoke rod of said mounting mechanism, whereby the eye member may be manually rotated simultaneously in a plurality of different directions so as to provide a wide range of adjustment of the eye members relative to the yoke rod and permit the eye members to be properly alined with the eye openings in a doll head.

Other objects are to provide means of the character described comprising a strip fastened to an eye member which strip is formed to provide a socket coaxial with the outer spherical surface of the eye member to rotatably receive a sphere that is slidably mounted on the yoke rod of a mounting mechanism, thereby forming a ball and socket joint which permits the eye members to be revolved about a plurality of axes at various angular relations to each other to easily adjust said members into proper register with the eye opening in a doll head; and to obtain other advantages and results as will be brought out by the following description.

Referring to the accompanying drawing in which corresponding and like parts are designated throughout the several views by the same reference characters, Figure 1 is a rear elevation of an eye set embodying my invention, showing it mounted in a doll head which is illustrated in vertical section.

Figure 2 is a transverse sectional view on the line 2—2 of Figure 1.

Figure 3 is a horizontal sectional view on the line 3—3 of Figure 1.

Figure 4 is a rear elevation of an assembled eyeball.

Figure 5 is a vertical sectional view on the line 5—5 of Figure 4.

Figure 6 is a side elevation of an assembled eyeball showing the adjustability of the eyeball around a horizontal axis.

Figure 7 is a rear elevation of an assembled eyeball showing the adjustability of the eyeball around an intersecting horizontal axis.

Figure 8 is a plan view of an eyeball partly broken away to show the pivotal means and the adjustability of the eyeball about a vertical axis.

Figure 9 is a vertical sectional view of a modification of an eyeball showing the mounting thereof on the yoke member.

Figure 10 is a rear elevation of the modification of the eyeball shown in Figure 9.

Figure 11 is a detached composite transverse sectional view of the two sections of a modification of the ball on which the eye member is mounted.

Figure 12 is a transverse sectional view thereof showing the two sections of the ball attached together.

Figure 13 is a perspective view of the shell of a further modification of the ball before completion, and Figure 14 is a rear elevation thereof after completion of the ball.

Specifically describing the embodiment of the invention illustrated in Figures 1 to 8 inclusive, the reference character A designates a doll head of the usual construction formed of penetrable material having the usual eye sockets B in the face portion thereof. In each of the eye sockets is arranged an eye member 1 mounted on a rod or yoke member 2 to rotate to simulate the opening and closing of the eyes. The rod 2 is pivotally mounted in a bracket 3 which is secured on a supporting member or bar 4.

The supporting member 4, described and claimed in my copending application Serial No. 672,116, consists of a flat strip of ductile metal having end sections 5. Formed integrally with said end sections are prongs 6 adapted to penetrate the doll head. The central section 7 of the bar 4 is extensible so that upon the placing of said bar in the desired position within the head, longitudinal pressure may be applied between the end sections of the bar to force the prongs 6 into the penetrable material of the doll head A, thereby firmly mounting the bar 4 within the head.

The bracket 3 which is secured to the bar 4, is of a form described in my said copending application and consists of a single strip of sheet metal which is folded upon itself so as to form a reentrant groove 8 which serves as a bearing for the yoke member 2. The bracket 3 has a spring tongue 9 which is so placed as to bear against and force outwardly toward the face of the doll head the yoke member 2 upon which the eye members are mounted, thereby yieldingly holding the eye members in the eye sockets.

The yoke member 2 is in the form of a rod having its end portions either rectangular or polygonal in cross-section, as shown at 10, and disposed in axial alinement with each other so as to slidably support the eye members 1. Connected to the yoke member is the usual pendulum arm 11 having a weight 12 attached thereto so as to cause rotation of the eyeballs by gravity to simulate closing of the eyes when the doll is placed in horizontal position.

Each eye member 1 consists of a hemispherical body 13 recessed along its horizontal axis as shown at 14 and also recessed in the central portion as shown at 15. The eye members are also recessed on the spherical surface to receive a disc 16 upon which a representation of the iris and pupil of an eye is printed in colors, and over which is arranged within said recess, a circular piece of transparent material 17, such as glass or crystal, having a spherical outer surface. Above the pupil is fixedly mounted an eyelid 18, consisting of a strip of metal cupped to correspond with the outer spherical surface of the body 13 so that the eyelid is rotatable with the body. Fastened between the inner surface of the eyelid 18 and the outer surface of the body 13, are eyelashes 19.

The construction of the eye member 1 may be modified as shown in Figures 9 and 10 so as to include a shell 20 consisting of substantially a hollow hemisphere which has a representation of a pupil and iris printed on its spherical surface, above which a cupped strip simulating an eyelid 21 is fastened. Eyelashes 22 projecting outwardly from the surface of the eye member 1, are mounted between the outer surface of said eye shell and the inner surface of the eyelid 21. The shell 20 is recessed along its horizontal axis as shown at 23.

The present invention relates particularly to the means for mounting the eye members on the yoke rod or other support. This means comprises an adjustable joint or connection for each eye member which includes a pivot member in the form of a sphere 24 and an adjusting member 33 having a socket for the sphere. The sphere 24 has a radius considerably smaller than that of the outer spherical surface of the body 13 and has a slot 25 through the central portion thereof to slidably receive one end 10 of the yoke member 2 so as to permit adjustment of the sphere longitudinally of and coaxial with said yoke member and ensure rotation of the sphere with the yoke rod.

The sphere 24 may be either a solid ball with a slot through the central portion thereof, or may be composed of two hollow shells 26 and 27 hemispherical in shape as shown in Figures 11 and 12. Here, the edge portion of the shell 26 is reduced in diameter to form a shoulder 28 and lip 29. The lip 29 is of such a diameter as to tightly engage the inner surface of the shell 27, the edge of said shell bearing against the shoulder 28, thereby forming a sphere. The edge of each shell is notched at 30 at diametrically opposite points so as to form with the notch of the other shell, a slot 31 for receiving the end 10 of the yoke member 2.

Another form of the sphere 24 is shown in Figures 13 and 14. This form consists of an initially cupped shell 32 having a spherical surface 320 at one end thereof and a plurality of triangular prongs 333 at the other so spaced that upon their being bent inwardly a spherical surface is formed, to produce a complete sphere in conjunction with the spherical end surface 320. Slots 334 are formed in diametrically opposite walls of the shell 32 so as to receive the end 10 of the yoke member 2.

Cooperating with the sphere 24 and mounted within the recess 15 of the eye member 1, is the adjusting or socket member 33 formed preferably of a single strip of ductile sheet metal bent to form a base or end wall 36 and two side walls 34 and 35, one of which is slightly greater in length than the other and is bent or clinched around the end of the latter at 360 to secure said side walls together. This socket member is secured to the eye member body 13 by a rivet 37 which passes through the body at the base of the recess 16 and through the end wall 36 of the socket member. In the form of eye member shown more particularly in Figure 5, the clamp 33 is fastened along the horizontal axis of the eye member 1, the circular disc 16 covering the head of the rivet 37 thereby preventing it from showing on the spherical surface of the eyeball. When the iris and pupil are printed directly upon the spherical surface of the eyeball, as in the form shown in Figure 9, the clamp 33 is fastened to the eyeball diagonally to its horizontal axis so that the head of the rivet will be covered by the eyelid 21. The side walls 34 and 35 of the socket member have complemental segmentally spherical cupped portions 340 and 350 of approximately the same radius as the sphere 24, to rotatably and slidably receive the sphere, there being a yielding frictional engagement between the portions 34, 35 and the sphere. The socket member is secured in the eye member body 13 with the cupped portions 340, 350 located concentrically or coaxially with the spherical surface of said eye member body. The eye member bodies 1 are connected to the socket members 33 before the side walls 34 and

35 of the socket members are connected together, and the spheres are then placed between said side walls and the latter are pressed together so that the cupped portions engage the surfaces of the spheres 24 and permit the eye members to be rotated simultaneously about various intersecting axial lines of the sphere. The ends of the side walls 34 and 35 are then secured together at 36 as above described.

In operation, if the eye members require adjustment to overcome the appearance of diverging or converging sight lines, it is simply necessary to rotate the eye body 13 about a vertical axis of the sphere 24, the sphere being held against rotation by the yoke rod, and the socket member sliding over the surface of the sphere. If it is necessary to adjust the eye member to bring the eyelashes into proper horizontal position, or to move the pupils into horizontal alinement, one or both of the eye bodies should be rotated about a horizontal axis of the spheres. Any intermediate adjustments can be made by rotating one or both of the eye bodies simultaneously upon a plurality of the axial lines of the spheres. The eye members may be moved toward or from each other by sliding the spheres longitudinally of the yoke rod. The pivot member or sphere 24 being considerably smaller in diameter than the outer spherical surface of the body 13, in connection with the adjusting member 33, provides considerable leverage for rotating the eye body about the pivot member, and also enables easy and quick minute arcuate movements of the eye body. Furthermore the parts are small and light in weight which is highly desirable in doll eye structures.

While I have shown my invention as embodied in certain details of construction it should be understood that the details of structure may be modified and changed by those skilled in the art without departing from the spirit or scope of the invention.

Having thus described my invention, what I claim is:

1. The combination with a doll's eye comprising a hollow hemispherical body, and a support therefor, of means for adjustably connecting said body to said support including a spherical pivot member mounted and held against rotation on said support having a radius smaller than that of the outer spherical surface of the body, and an adjusting member connected to said body and having a socket rotatably receiving and having yielding frictional engagement with said pivot member, said adjusting member being formed of a single strip of metal and having a base portion and two opposed side walls connected thereto and disposed at opposite sides of said pivot member, said side walls having complemental segmentally spherical cupped portions of the same radius as said sphere and forming said socket and said base portion being connected to said body by a rivet passing through said base portion and said body, one of said side walls being longer than the other and bent over the end of the latter to secure said side walls together.

2. The combination with a doll head having eye openings, an eye member for each eye opening including a hollow hemispherical body, a yoke rod rotatably mounted in said head for oscillating said eye members in said openings to simulate opening and closing of the eyes, and means mounting said eye members on said yoke rod including a joint between said yoke member and each eye member comprising two members one connected to each of said yoke rod and said eye member, one comprising a sphere having a radius substantially less than that of the outer spherical surface of said eye member, and the other a socket member having a socket formed with spherical walls concentric with said spherical surface of the eye member and receiving and frictionally engaging said sphere, whereby said eye members are free to be adjusted on said yoke rod to aline the eye members with said eye openings independently of the oscillation of the said eye members to simulate opening and closing of the eyes.

3. The combination set forth in claim 2 wherein said adjusting member is formed of a single strip of metal and has a base portion and two opposite side walls connected thereto and disposed at opposite sides of said sphere, said base portion being connected to the concave side of said body and said side walls having complemental segmentally spherical cupped portions of the same radius as said sphere and forming said socket.

4. The combination set forth in claim 2 wherein said adjusting member is formed of a single strip of metal and has a base portion and two opposed side walls connected thereto and disposed at opposite sides of said pivot member, said side walls having complemental segmentally spherical cupped portions of the same radius as said sphere and forming said socket and said base portion being connected to said body, one of said side walls being longer than the other and bent over the end of the latter to secure said side walls together.

5. The combination with a doll's eye comprising a hollow hemispherical body, and a support therefor, of means for adjustably connecting said body to said support including a sphere mounted and held against rotation on said support having a radius smaller than that of the outer spherical surface of the body, and an adjusting member connected to said body and having a socket formed with spherically curved walls rotatably receiving and having yielding frictional engagement with said sphere, said adjusting member being formed of a single strip of metal and having a base portion and two opposed side walls connected thereto and disposed at opposite sides of said sphere, said base portion being connected to the concave side of said body and said side walls having complemental segmentally spherical cupped portions of the same radius as said sphere and forming said socket whereby said body is free to be adjusted relative to said support and is held in adjusted position by the frictional engagement between said sphere and said adjusting member.

6. The combination with a doll's eye comprising a hollow hemispherical body, and a support therefor, of means for adjustably connecting said body to said support including a sphere mounted and held against rotation on said support having a radius smaller than that of the outer spherical surface of the body, and an adjusting member connected to said body and having a socket formed with spherically curved walls rotatably receiving and having yielding frictional engagement with said sphere, said adjusting member being formed of a single strip of metal and having a base portion and two opposite side walls connected thereto and disposed at opposite sides of said sphere, said side walls having complemental segmentally spherical cupped portions of the same radius as said sphere and forming said socket, and said base portion being connected to the concave side of said body by a rivet passing through said base portion and said body whereby said body is free to be adjusted relative to said support and is held in adjusted position by the frictional engagement between said sphere and said adjusting member.

7. The combination with a doll head having eye openings, an eye member for each eye opening including a hollow hemispherical body, a yoke rod rotatably mounted in said head for oscillating said eye members in said openings to simulate opening and closing of the eyes, of a sphere having a radius smaller than that of the outer spherical surface of said body and having an axial opening coaxially receiving said yoke rod for sliding of the body longitudinally of said rod, and an adjusting member connected to said body having a socket formed with spherical walls concentric with the spherical surface of said body and frictionally receiving said sphere so that said adjusting member may rotate on said sphere about angularly disposed axes of the latter, whereby said eye members are free to be adjusted on said yoke rod to aline the eye members with said eye openings independently of the oscillation of the said eye members to simulate opening and closing of the eyes.

NICHOLAS POPOVICH.